(12) United States Patent
Hanson et al.

(10) Patent No.: US 11,677,263 B2
(45) Date of Patent: Jun. 13, 2023

(54) OFF GRID POWER SUPPLY SYSTEM

(71) Applicants: Al Hanson, Phoenix, AZ (US); Jeffery Brownmiller, Casa Grande, AZ (US)

(72) Inventors: Al Hanson, Phoenix, AZ (US); Jeffery Brownmiller, Casa Grande, AZ (US)

( * ) Notice: Subject to any disclaimer, the term of this patent is extended or adjusted under 35 U.S.C. 154(b) by 0 days.

(21) Appl. No.: 17/735,739

(22) Filed: May 3, 2022

(65) Prior Publication Data
US 2022/0368152 A1  Nov. 17, 2022

Related U.S. Application Data

(60) Provisional application No. 63/291,974, filed on Dec. 21, 2021, provisional application No. 63/189,325, filed on May 17, 2021.

(51) Int. Cl.
| | |
|---|---|
| *H02J 9/06* | (2006.01) |
| *H02J 7/00* | (2006.01) |
| *H02J 7/35* | (2006.01) |
| *H02J 7/14* | (2006.01) |
| *B60L 53/51* | (2019.01) |
| *B60L 53/52* | (2019.01) |

(52) U.S. Cl.
CPC ............. *H02J 9/06* (2013.01); *H02J 7/0029* (2013.01); *H02J 7/0048* (2020.01); *H02J 7/0068* (2013.01); *H02J 7/14* (2013.01); *H02J 7/35* (2013.01); *B60L 53/51* (2019.02); *B60L 53/52* (2019.02); *H02J 2300/24* (2020.01); *H02J 2300/28* (2020.01)

(58) Field of Classification Search
CPC .......... H02J 9/06; H02J 7/0048; H02J 7/0029; H02J 7/0068; H02J 7/14; H02J 7/35; H02J 2300/28; H02J 2300/24; H02J 7/00; B60L 53/51; B60L 53/52
See application file for complete search history.

(56) References Cited

U.S. PATENT DOCUMENTS

2018/0069416 A1* 3/2018 Brace .................... F03D 9/00

* cited by examiner

*Primary Examiner* — Robert L Deberadinis
(74) *Attorney, Agent, or Firm* — Bruce A. Lev

(57) ABSTRACT

An off grid electric vehicle charging system that includes an off grid power supply system and an electric vehicle charging plug adapted to connect with any electric vehicle and provide electric power thereto. The off grid power supply system incorporates rechargeable battery members adapted to provide uninterruptible off grid electrical power and are charged and recharged by solar panels and/or wind turbines and/or a water wheel. Furthermore, when the solar panels and/or wind turbines and/or a water wheel are insufficient to recharge the battery members a motorized engine is automatically started to recharge the battery members until the solar panels and/or wind turbines and/or a water wheel are sufficiently operable to recharge the battery members once again. The electric vehicle charging plug is adapted to connect with any electric vehicle and provide DC electric power thereto. The system further includes an alternator for converting the electricity from the battery members into DC electrical current, automatic on/off switches, and a control panel.

12 Claims, 5 Drawing Sheets

OFF GRID POWER SUPPLY SYSTEM

CROSS-REFERENCE TO RELATED APPLICATION

The present application is related to and claims priority from prior provisional application Ser. No. 63/189,325, filed May 18, 2021, and 63/291,974, filed Dec. 21, 2021, which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of off grid power supply systems, and more specifically to off grid electric vehicle charging systems.

2. Description of the Related Art

Prior art off grid power supply systems incorporate solar, wind, hydro, primary power with stand by generators run be motorized engines that turn on when their batteries are at 50% levels and turn off when charged to 90%. Furthermore, these prior art off grid power supply systems do not incorporate alternators to convert AC power into DC power and vice versa with an AC inverter. The prior art batteries store DC power only. Furthermore, the prior art off grid power supply systems are not designed to connect with a 480 to 300 volt converter and power electric vehicles and thereby do not include electric vehicle charging plugs. Furthermore, the prior art off grid power supply systems experience a 30 to 45% power loss every time electricity is converted from AC to DC. Thus, a need exists for an improved off grid power supply systems to avoid the above-mentioned problems.

BRIEF SUMMARY OF THE INVENTION

In view of the foregoing disadvantages inherent in the known off grid power supply systems and information readily available art, the present invention provides a novel off grid electric vehicle charging system. The general purpose of the present invention, which will be described subsequently in greater detail, is to provide an off grid electric vehicle charging system that includes an off grid power supply system that incorporates rechargeable battery members adapted to provide uninterruptible off grid electrical power that are adapted to be charged and recharged by solar panels and/or wind turbines and/or a water wheel. Furthermore, when the solar panels and/or wind turbines and/or a water wheel are insufficient to recharge the battery members a motorized engine is automatically started to recharge the battery members until the solar panels and/or wind turbines and/or a water wheel are sufficiently operable to recharge the battery members once again. By using natural gas as a back up to solar and wind power will reduce demand on an existing power grid and reduce total emissions. The system further includes an alternator for electrical current to charge a car battery. Furthermore, the off grid electric vehicle charging system includes an electric vehicle charging plug adapted to connect with any electric vehicle and provide DC electric power thereto.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an off grid power supply system, constructed and operative according to the teachings of the present invention.

Figure 1:
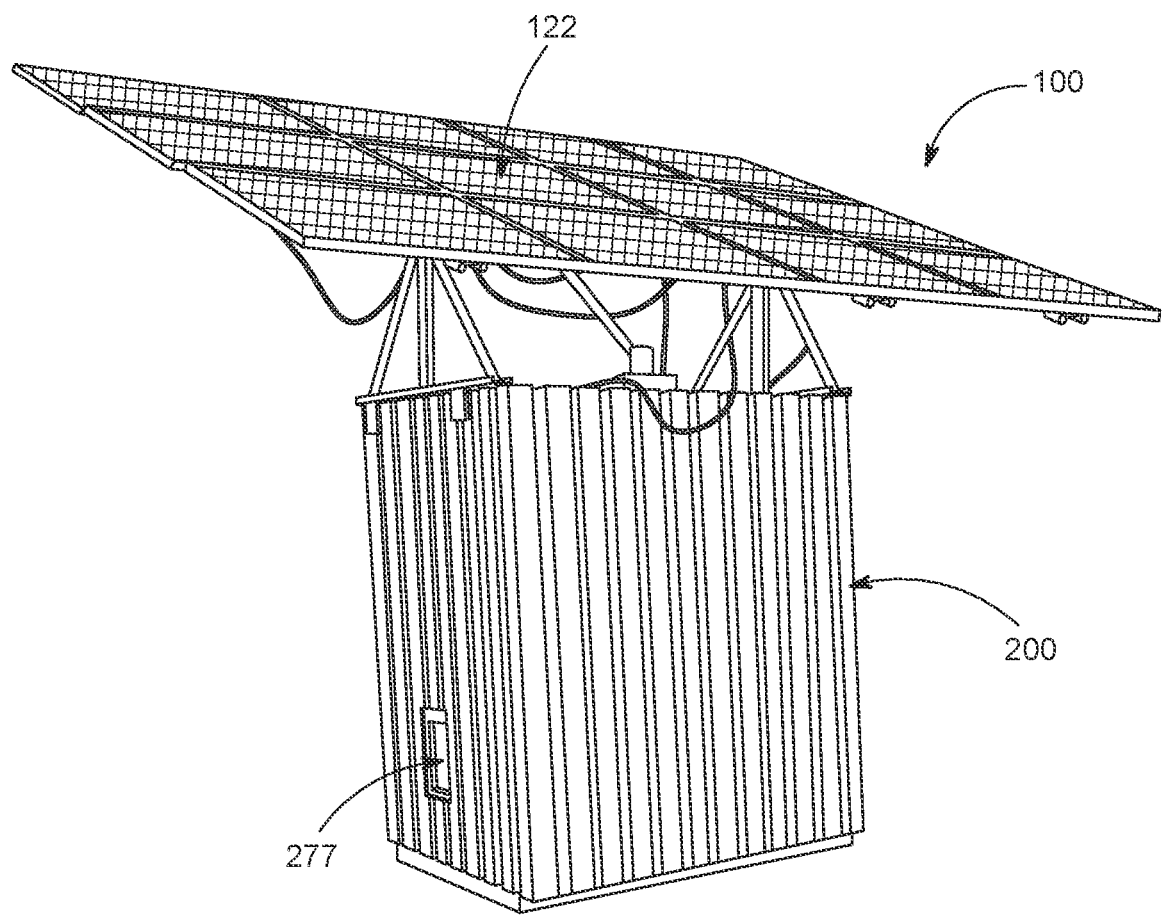
FIG. 1 shows a back view of the off grid power supply system according to an embodiment of the present invention.
Figure 2:
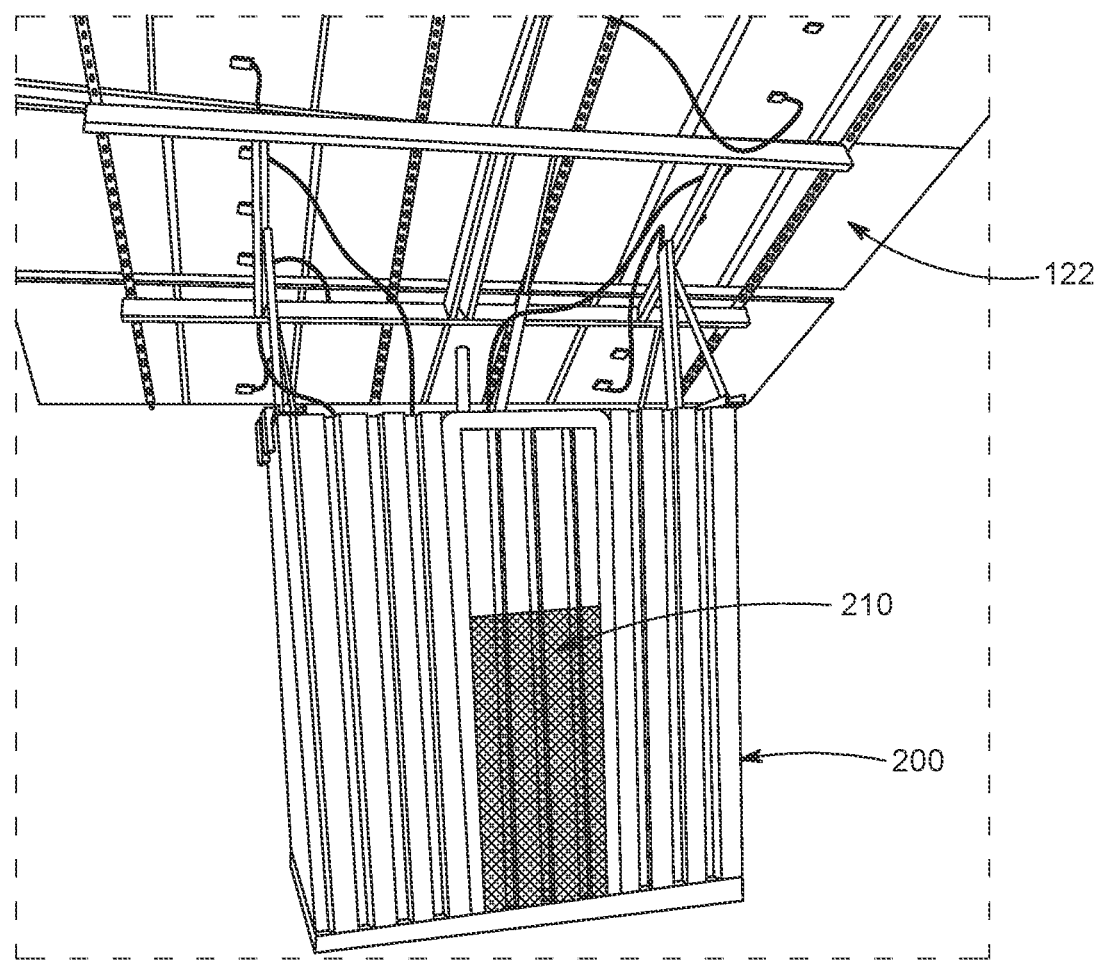
FIG. 2 shows a front view of the off grid power supply system according to the embodiment of the present invention in FIG. 1.
Figure 3:
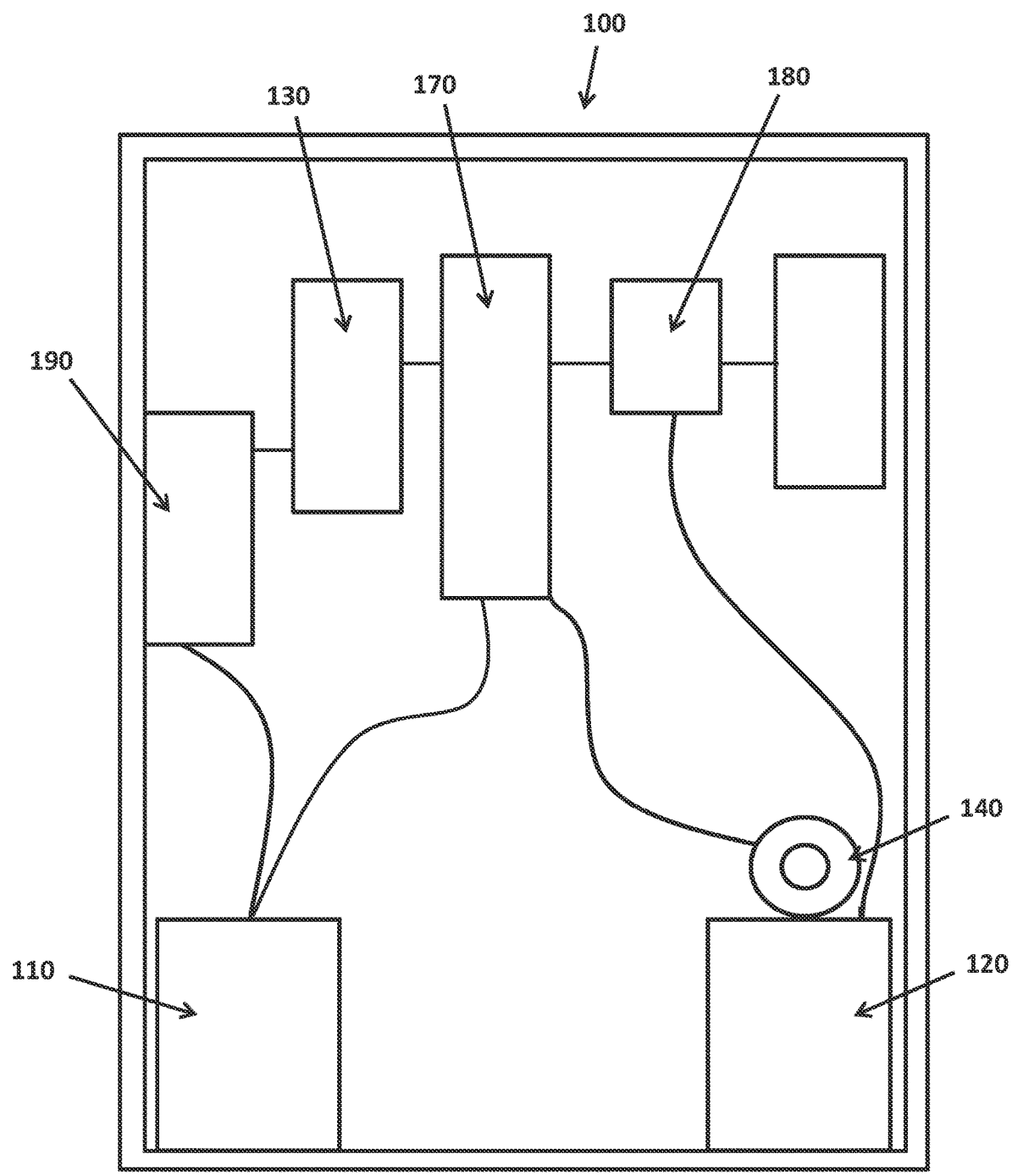
FIG. 3 shows a layout of some of the parts of the off grid power supply system of the off grid electric vehicle charging system according to the embodiment of the present invention in FIG. 1.
Figure 4:
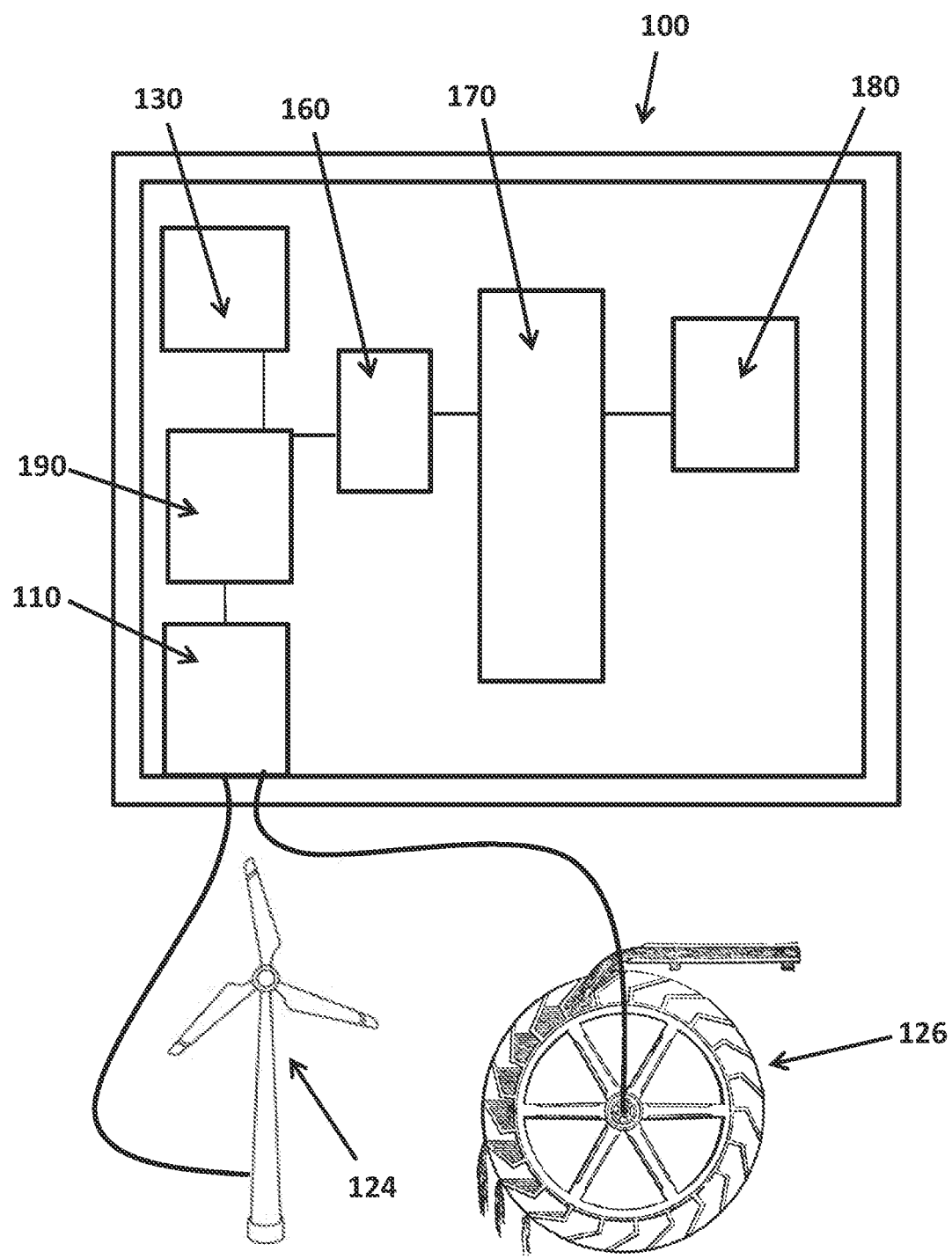
FIG. 4 shows a layout of some more of the parts of the off grid power supply system and the use of wind turbines and water wheels of the off grid electric vehicle charging system according to the embodiment of the present invention in FIG. 1.

The various embodiments of the present invention will hereinafter be described in conjunction with the appended drawings.

DETAILED DESCRIPTION

As discussed above, embodiments of the present invention relate to an off grid electric vehicle charging system that includes an off grid power supply system and an electric vehicle charging plug adapted to connect with any electric vehicle and provide electric power thereto. The off grid power supply system incorporates rechargeable battery members adapted to provide uninterruptible off grid electrical power and are charged and recharged by solar panels and/or wind turbines and/or a water wheel. Furthermore, when the solar panels and/or wind turbines and/or a water wheel are insufficient to recharge the battery members a motorized engine is automatically started to recharge the battery members until the solar panels and/or wind turbines and/or a water wheel are sufficiently operable to recharge the battery members once again. The electric vehicle charging plug is adapted to connect with any electric vehicle and provide DC electric power thereto. The system further includes an alternator for changing the electricity from the battery members into AC electrical current, automatic on/off switches, and a control panel. The objective of the off grid electric vehicle charging system is to offer a high quality 24 hour per day 365 days per year power supply for off grid services including connecting to and powering electric vehicles.

Referring now to the drawings FIGS. 1-5, the off grid electric vehicle charging system includes an off grid power supply system 100 comprises a housing 200 including a front door 210. Within the housing 200 the off grid power supply system 100 incorporates rechargeable battery members 110 adapted to provide uninterruptible off grid electrical power and are charged and recharged by a power unit 120, which may include solar panels 122, wind turbines 124, a water wheel 126, and a motorized engine formed as a gas, diesel, bio fuel, liquid propane engine, or the like. Furthermore, the off grid power supply system 100 incorporates a solar panel, wind turbine and water wheel controller 130, an alternator 140 for converting the electricity from the battery members into DC electrical current, a DC to AC inverter 170, an AC breaker 160, an automatic engine controller and on/off switch 180, and a control panel 190.

In operation, battery members 110 provide the desired electrical power. The solar panels, wind turbines, and water wheel are used to continuously charge the battery members, and if and when the solar panels, wind turbines, and water wheel are insufficient to provide enough power to keep the batteries charged to at least 50% capacity the engine will automatically turn on to recharge the batteries to at least 90%, thereby keeping the batteries charged enough to provide high quality 24 hour per day 365 days per year power for off grid service and extend battery life.

The electricity generated and stored can be converted from DC to AC as needed depending on the desired electrical output.

The system further includes a DC power disconnect controller, an engine controller with auto-start, and a battery charge monitor.

The entire system is enclosed within a housing made of galvanized steel and sized and shaped for easy shipping via a standard freight truck or pickup truck and shipped for servicing. In the preferred embodiment the housing has 4 foot width, a 6 foot length, and a 7 foot height. Furthermore, in the preferred embodiment, there will be three models. The first model will include a 6 KW 240 AC inverter; the second model will include a 12 KW 240 AC inverter; the third model will include an EV charger 16 KW inverter direct 50 volt DC 50 amp charger that is all DC power and no AC power.

Figure 5:
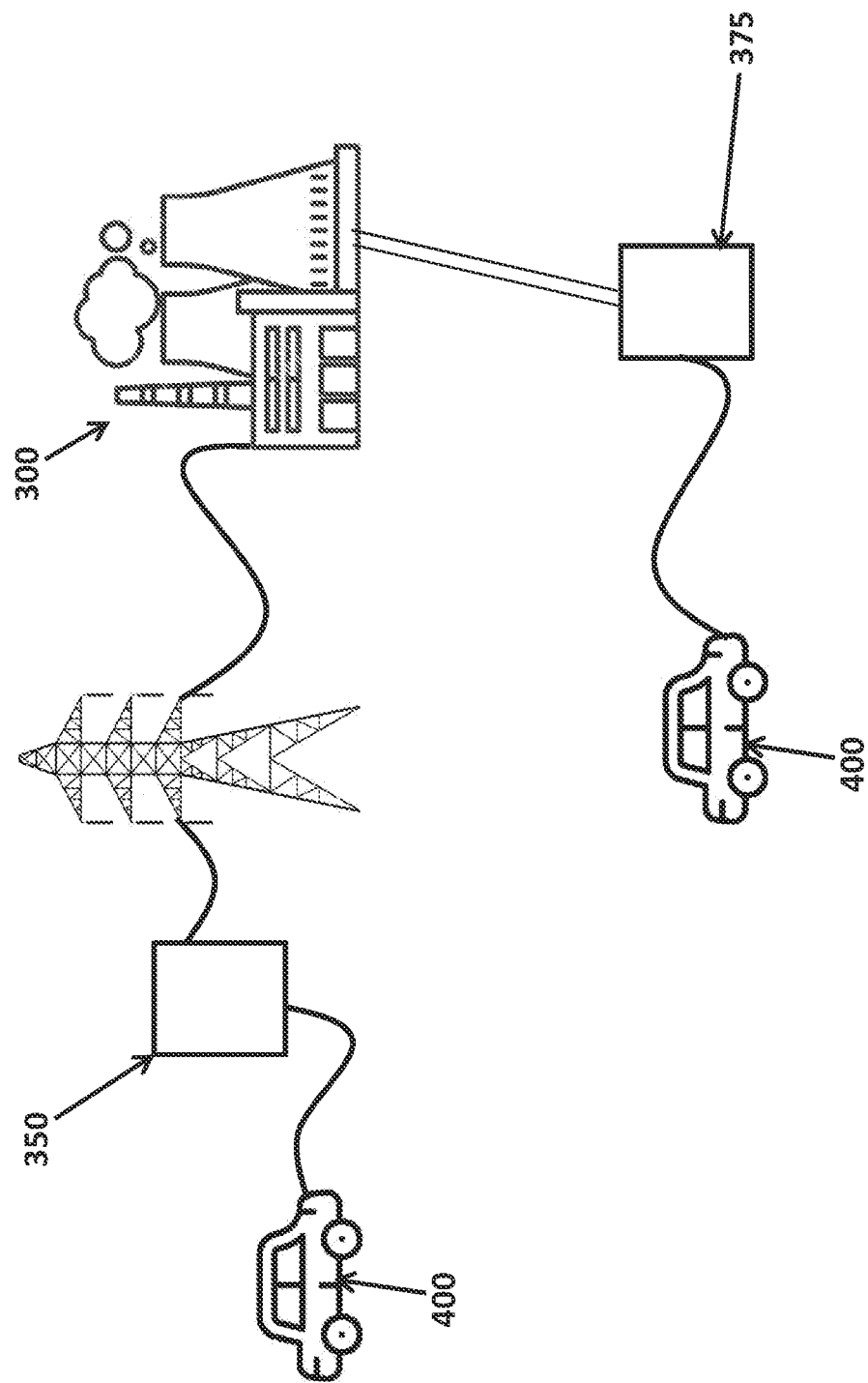
FIG. 5 shows a prior art power supply system used for charging electric vehicles versus the instant off grid electric vehicle charging system according to the embodiment of the present invention in FIG. 1.

Referring now to FIG. 5, a prior art power supply system used for charging electric vehicles is shown versus the instant off grid electric vehicle charging system. Power station 300 supplies electric power to a prior art DC to AC converter 350, which in turn provides electric power to an electric vehicle 400. However, in this configuration there is a power loss of between 30% to 40%. The instant off grid electric vehicle charging system, in this example, uses an off-site DC natural gas generator 375 to create DC power which is converted by the instant off grid power supply system 100 of the off grid electric vehicle charging system into AC power for use by an electric vehicle 400. In this configuration of the off grid electric vehicle charging system there is zero power loss.

The off grid power supply system 100 of the off grid electric vehicle charging system includes an electric vehicle charging plug 277 that is connected to the off grid power supply system 100 and adapted to be releasably connected with any electric vehicle to provide DC electric power thereto without any power loss during transfer.

Furthermore, DC power can be stored in batteries; all electric cars are DC powered; DC power is not easy to transport in power lines; AC power cannot be stored; when converting from AC to DC there is a 30-45% power loss; when converting from DC to AC there is a 30-45% power loss; when transporting AC power in power lines there is a power loss; DC power is easier to regulate; AC power has to operate at 60 Hz; the current inventive system is complete and no on site assembly is needed; car charging is total DC 480 to DC 300 plus volts to the car; and no AC converter is needed. The system is fully functioning when shipped from the manufacturer thereby reducing construction and start-up costs. The housing is built from a metallic material to protect from fire and is easy to replace when damaged from tornados, hurricanes, lightning, forest fires, or the like.

In the preferred embodiment, the off grid power supply system 100 comprises a housing 200 including at least one exterior wall forming an interior volume, and a front door 210 located within one of the exterior walls and provides access to the interior volume of the housing; a rechargeable battery member 110 located within the interior volume; a power unit 120 located within the interior volume electrically connected to the rechargeable battery member and is adapted to recharge the rechargeable battery member; at least one solar panel 122 attached to a top surface of the housing, is electrically connected to the rechargeable battery member, and is adapted to gather solar energy and transfer solar energy to the rechargeable battery member; at least one power charging plug 277 connected to the at least one exterior wall of the housing, is electrically connected to the rechargeable battery member, and is adapted to provide electrical power to an external device; an alternator 140 located within the interior volume, is electrically connected between the rechargeable battery member and the at least one power charging plug, and is adapted to convert electrical power and provide AC or DC electric power to the at least one power charging plug 277; a controller 130 located within the interior volume, is electrically connected to the rechargeable battery member, the power unit, and the at least one solar panel, and is adapted such that when the rechargeable battery member reaches a first predetermined stored power level the controller allows energy from the power unit to recharge the rechargeable battery member, and such that when the power unit is incapable of producing energy to send to the rechargeable battery member the controller allows energy from the at least one solar panel to recharge the rechargeable battery member; and wherein when the rechargeable battery member reaches a second predetermined stored power level the controller discontinues the transfer of energy to the rechargeable battery member, such that off grid power supply system can provide uninterruptible electric power to the at least one power charging plug.

The off grid power supply system may further comprising a wind turbine 124 located outside of the interior volume of the housing, is electrically connected to the rechargeable battery member 110, and is adapted to gather wind energy and transfer wind energy to the rechargeable battery member; wherein the controller 130 is electrically connected to the wind turbine and is adapted such that when the power unit is incapable of producing energy to send to the rechargeable battery member the controller allows energy from the wind turbine to recharge the rechargeable battery member; and wherein when the rechargeable battery member reaches the second predetermined stored power level the controller discontinues the transfer of energy to the rechargeable battery member.

The off grid power supply system may further comprising a water wheel 126 located outside of the interior volume of the housing, is electrically connected to the rechargeable battery member 110, and is adapted to gather energy from moving water and transfer energy to the rechargeable battery member; wherein the controller 130 is electrically connected to the water wheel and is adapted such that when the power unit is incapable of producing energy to send to the rechargeable battery member the controller allows energy from the water wheel to recharge the rechargeable battery member; and wherein when the rechargeable battery member reaches the second predetermined stored power level the controller discontinues the transfer of energy to the rechargeable battery member.

The off grid power supply system may further comprising an automatic engine controller and on/off switch 180 electrically connected between the controller and the power unit; an AC/DC circuit breaker 160 electrically connected between the alternator and the at least one power charging plug; an engine auto-starter incorporated into the controller 130 electrically connected between the controller and said power unit; and a battery charge monitor incorporated into the rechargeable battery member 110.

The power unit may be formed from a variety of power unit configurations including a gasoline powered engine, a diesel powered engine, a bio-fueled engine, and a propane powered engine. Furthermore, the housing 200 is formed from galvanized steel.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An off grid power supply system comprising:
   a housing including:
      at least one exterior wall;
         wherein said at least one exterior wall forms an interior volume of said housing; and
      a front door;
         wherein said front door is located within one of said at least one exterior wall and provides access to said interior volume of said housing;
   a rechargeable battery member;
      wherein said rechargeable battery member is located within said interior volume of said housing;
   a power unit;
      wherein said power unit is located within said interior volume of said housing, is electrically connected to said rechargeable battery member, and is adapted to recharge said rechargeable battery member;
   at least one solar panel;
      wherein said at least one solar panel is attached to a top surface of said housing, is electrically connected to said rechargeable battery member, and is adapted to gather solar energy and transfer solar energy to said rechargeable battery member;
   at least one power charging plug;
      wherein said at least one power charging plug is connected to said at least one exterior wall of said housing, is electrically connected to said rechargeable battery member, and is adapted to provide electrical power to an external device;
   an alternator;
      wherein said alternator is located within said interior volume of said housing, is electrically connected between said rechargeable battery member and said at least one power charging plug, and is adapted to convert electrical power and provide AC or DC electric power to said at least one power charging plug;
   a controller;
      wherein said controller is located within said interior volume of said housing, is electrically connected to said rechargeable battery member, said power unit, and said at least one solar panel, and is adapted such that when said rechargeable battery member reaches a first predetermined stored power level said controller allows energy from said power unit to recharge said rechargeable battery member, and such that when said power unit is incapable of producing energy to send to said rechargeable battery member said controller allows energy from said at least one solar panel to recharge said rechargeable battery member; and
      wherein when said rechargeable battery member reaches a second predetermined stored power level said controller discontinues the transfer of energy to said rechargeable battery member;
   wherein said off grid power supply system is adapted to provide uninterruptible electric power to said at least one power charging plug.

2. The off grid power supply system of claim 1, further comprising a wind turbine located outside of said interior volume of said housing, is electrically connected to said rechargeable battery member, and is adapted to gather wind energy and transfer wind energy to said rechargeable battery member; wherein said controller is electrically connected to said wind turbine and is adapted such that when said power unit is incapable of producing energy to send to said rechargeable battery member said controller allows energy from said wind turbine to recharge said rechargeable battery member; and wherein when said rechargeable battery member reaches said second predetermined stored power level said controller discontinues the transfer of energy to said rechargeable battery member.

3. The off grid power supply system of claim 1, further comprising a water wheel located outside of said interior volume of said housing, is electrically connected to said rechargeable battery member, and is adapted to gather energy from moving water and transfer energy to said rechargeable battery member; wherein said controller is electrically connected to said water wheel and is adapted such that when said power unit is incapable of producing energy to send to said rechargeable battery member said controller allows energy from said water wheel to recharge said rechargeable battery member; and wherein when said rechargeable battery member reaches said second predetermined stored power level said controller discontinues the transfer of energy to said rechargeable battery member.

4. The off grid power supply system of claim 1, further comprising an automatic engine controller and on/off switch electrically connected between said controller and said power unit.

5. The off grid power supply system of claim 4, further comprising an AC circuit breaker electrically connected between said alternator and said at least one power charging plug.

6. The off grid power supply system of claim 5, further comprising a DC circuit breaker electrically connected between said alternator and said at least one power charging plug.

7. The off grid power supply system of claim 4, further comprising an engine auto-starter electrically connected between said controller and said power unit.

8. The off grid power supply system of claim 1, further comprising a battery charge monitor electrically to said rechargeable battery member.

9. The off grid power supply system of claim 1, wherein said power unit is formed as a gasoline powered engine.

10. The off grid power supply system of claim 1, wherein said power unit is formed as a diesel powered engine.

11. The off grid power supply system of claim 1, wherein said power unit is formed as a propane powered engine.

12. The off grid power supply system of claim 1, wherein said housing is formed from galvanized steel.

\* \* \* \* \*